United States Patent [19]  [11] 4,015,693
Hayashida et al.  [45] Apr. 5, 1977

[54] LINING WEAR ADJUSTER

[75] Inventors: Yoshihiro Hayashida, Chigasaki; Haruyuki Amano, Ebina, both of Japan

[73] Assignee: Tokico Ltd., Kawasaki, Japan

[22] Filed: Dec. 12, 1975

[21] Appl. No.: 640,263

Related U.S. Application Data

[62] Division of Ser. No. 506,051, Sept. 16, 1974, Pat. No. 3,943,486.

[30] Foreign Application Priority Data

Jan. 17, 1974  Japan .............................. 49-8035

[52] U.S. Cl. .......................................... 188/79.5 P
[51] Int. Cl.² ....................................... F16D 65/58
[58] Field of Search ............... 188/79.5 P, 79.5 GT, 188/196 B, 1 A

[56] References Cited

UNITED STATES PATENTS 3,811,537  5/1974  Margetts ...................... 188/79.5 P
3,874,481  5/1975  Margetts ..................... 188/79.5 GT Primary Examiner—Duane A. Reger
Attorney, Agent, or Firm—Wenderoth, Lind & Ponack

[57] ABSTRACT

A lining wear warning and adjusting device for a brake shoe lining. A rotatable member pivotally supported on a non-rotatable member so as to be engaged with a brake shoe carrying a brake lining is pivotally moved when the brake shoe is actuated; means arranged on the non-rotatable member in engagement with the rotatable member permits the movement of rotatable member during the braking operation and prevents the movement in the reverse direction when the brake is released; and an electric switch operative in response to a predetermined amount of relative movement between the rotatable and non-rotatable members closes a warning circuit, the relative movement between the rotatable and non-rotatable members being proportional to an amount of lining wear.

1 Claim, 4 Drawing Figures

LINING WEAR ADJUSTER

This is a divisional application of application Ser. No. 506,051, filed Sept. 16, 1974, now U.S. Pat. No. 3,943,486.

BACKGROUND OF THE INVENTION

This invention relates to an automobile brake system and, more particularly, to a device for electrically detecting and warning when the lining wear reaches a predetermined limit.

In conventional lining wear warning devices, electric contacts or insulated wires are embedded in a brake lining so that, when lining wear is excessive, the contacts come in to contact with the brake drum or the insulated wires are cut, then the warning devices are actuated. These conventional devices are disadvantageous in the following points:

1. Because of the presence of metallic powder in the linings, the warning devices sometimes undergo erroneous operation under conditions where the linings contain water.

2. The warning devices cannot operate unless the brake is operating.

3. Molding the electric contacts or insulated wires within the linings raises the manufacturing cost of the linings.

BRIEF SUMMARY OF THE INVENTION

It is therefore an object of this invention to eliminate these disadvantages involved in the conventional devices and to provide a reliable lining wear warning device which is operative to electrically detect the lining wear.

According to the present invention, a lining wear warning device comprises a rotatable member pivotally supported on a non-rotatable member so as to be engaged with a brake shoe carrying a brake lining and to be pivotally moved when the brake shoe is actuated. Means are further arranged on the non-rotatable member in engagement with the rotatable member so as to permit the movement of rotatable member during a braking operation and to prevent the movement in the reverse direction when the brake is released, and an electric switch is responsive to a predetermined amount of relative movement between the rotatable and non-rotatable members and closes a warning circuit, said relative movement between the rotatable and non-rotatable members being proportional to an amount of lining wear.

Preferably, the rotatable member and the means in engagement with the rotatable member constitute a mechanism for automatically adjusting brake shoe clearance.

BRIEF DESCRIPTION OF THE DRAWING

Two embodiments of the present invention are illustrated in the accompanying drawings in which.

DETAILED DESCRIPTION OF THE EMBODIMENTS

Figure 1:
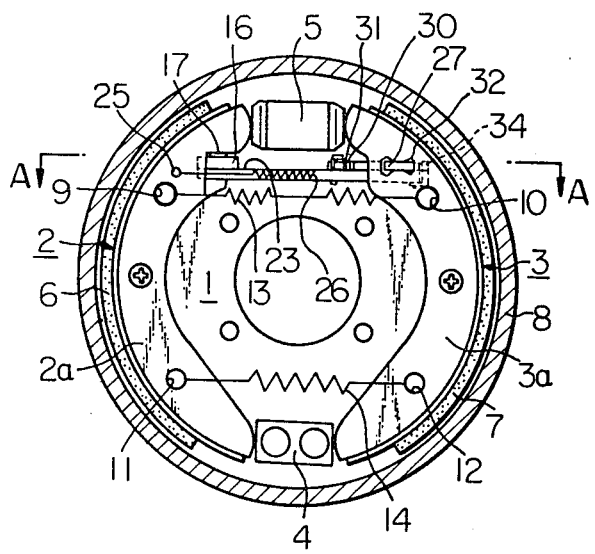
FIG. 1 is a front elevational view of a drum brake equipped with the lining wear warning apparatus according to the first embodiment of this invention.

Now the first embodiment of this invention will be described with reference to FIGS. 1 and 2. Referring first to FIG. 1, indicated at 1 is a back plate to be securely attached to the car body. On the back plate 1, a pair of shoes 2 and 3 are arranged in opposition to each other with their lower ends in contact with an anchor 4 and with their upper ends in contact with a wheel cylinder 5. The anchor 4 is mounted on the back plate 1. On the outer surfaces of the shoes 2 and 3 are adhered brake linings 6 and 7, respectively, so that these brake linings 6 and 7 can be engaged with a drum 8 which encircles these linings 6 and 7 and is rotatable with a wheel (not shown). Each of the shoes 2 and 3 has a pair of holes 9, 11 and 10, 12, respectively, bored in their web portions 2a and 3a into which are hooked a pair of return springs 13 and 14 adapted to urge the shoes 2 and 3 toward each other.

The shoes 2 and 3 are connected together by a strut 23 extending between these shoes 2 and 3 at a position between the return spring 13 and the wheel cylinder 5. The strut 23 is for the hand braking function and for automatically adjusting the brake shoe clearance.

Now the strut 23 and associated mechanism will be described in detail with reference to FIG. 2. The drum 8 is arranged in a position slightly spaced from the periphery of the back plate 1. The shoes 2 and 3 carrying linings 6 and 7 respectively are arranged in opposition to the inner wall surface of the drum 8, so that upon operation of wheel cylinder 5 (not shown in FIG. 2) they are displaceable right and left respectively (as viewed in the drawing) for braking the drum 8.

A hole 1a is bored in the back plate 1 at a suitable position and a portion of an L-shaped hand brake lever 16 is inserted through the hole 1a. The hand brake lever 16 is pivotally supported on a pin 17 arranged at one end of the strut 23. The forward end of the hand brake lever 16 is adapted to engage with the inner edge of web portion 2a of the shoe 2. At a suitable position on the portion of the hand brake lever 16 exposed outside from the back plate 1, a stop 18 is integrally attached to the lever 16 by means of pin 19 to limit the counter-clockwise movement of the lever 16. Indicated at 20 is a cover plate which is integral with the back plate 1 and cooperates with the drum 8 to prevent water and dust from entering the brake mechanism. Indicated at 21 is a dust cover adapted to cover the hole 1a bored in the back plate 1.

In the rear end portion of the hand brake lever 16 is formed a hole 22, into which one end of a wire or a cable (not shown) is engaged so that the hand brake lever 16 can be pulled in the direction of the arrow. As mentioned previously, the hand brake lever 16 is pivoted on the pin 17 at one end of the strut 23 and therefore, by pivoting the hand brake lever 16 on the pin 17, the strut 23 can be shifted leftwards along the back plate 1.

A hole 24 is bored in the strut 23 at a suitable position. A tension spring 26 is extended between the hole 24 and a hole 25 bored in the web portion 2a of the shoe 2 to urge the strut 23 rightwards so that the forward end portion 16a of the lever 16 keeps in contact with the inner edge of web portion 2a of the shoe 2.

On the opposite end of strut 23, an approximately L-shaped ratchet 27 is pivotally supported on a shaft 28 so that teeth 27a formed in the peripheral surface of the ratchet 27 engage with a claw 30 which is pivoted on a pin 29 at approximately the center of the strut 23 and is engageable with the teeth 27a to prevent the clockwise rotation of the ratchet 27. A spring 31 wound around the pin 29 has one engaged with one side edge of the claw 30 and another end engaged in the hole 24 formed in the strut 23, so that the claw 30 is urged counter-clockwise so as to be always engaged with the teeth 27a.

A projecting portion 27b of the ratchet 27 is loosely inserted into a hole 32 bored in the web portion 3a of shoe 3 with a slight clearance of $\Delta x$. The top end portion of this projecting portion 27b is bent 90° to form a stop 27c. A hole 33 is formed in the back plate 1 at a position immediately below the claw 30 and a tool (not shown) can be inserted therethrough for releasing the engagement between the claw 30 and the teeth 27a.

An electric switch 34 is arranged at the left end of the strut 23. The switch 34 may be, for example, a limit switch which is operative in responsive to the pivotal movement of the ratchet 27. More specifically, when the ratchet 27 is moved pivotally and reaches near the maximum automatic adjusting position (which will be described hereinafter), the switch 34 is operated by the ratchet 27 by way of an operating member 34a to detect the movement of the ratchet 27. In combination with an electric power source 35 and a warning indicator 36, the limit switch 34 comprises a warning circuit which is closed upon detection of a predetermined amount of movement of the ratchet 27 to start operation of an indicator 36. The indicator 36 may be a buzzer and/or a lamp located in the driver's compartment at any suitable position where the driver can be readily seen and/or hear it.

With the foregoing arrangement upon the carrying out of a braking operation by the driver, the shoes 2 and 3 are moved outwardly until the linings 6 and 7 are pressed against the inner circumference of the drum 8 to brake the same. In this operation, when the linings 6 and 7 are not excessively worn and so long as the relative movement between the shoes 2 and 3 is smaller than the clearance $\Delta x$ defined between the hole 32 bored in the web portion 3a and the projecting portion 27b of the ratchet 27, the ratchet 27 will not move and therefore will have no influence over the shoe clearance adjusting mechanism.

In the case when the linings are excessively worn and the relative movement between the shoes 2 and 3 exceeds the clearance $\Delta x$, one side edge (right side edge as viewed in FIG. 2) of the projecting portion 27b of the ratchet 27 will be engaged with the inner circumference of the hole 32 bored in the web portion 3a so that, as the shoe 3 moves leftwards, the ratchet 27 will pivotally move counter-clockwise, since the strut 23 pulled by the spring 26 towards the opposite shoe 2 will not move relative to the shoe 2.

Since the claw 30 is urged counter-clockwise by means of spring 31 to be engage with the teeth 27a formed in the circumference of the ratchet 27, the ratchet 27 rotates counter-clockwise stepwise from one tooth to another.

When the driver releases the brake pedal and the liquid pressure within the wheel cylinder 5 decreases, the shoes 2 and 3 are moved back inwardly by the restoring action of the return springs 13 and 14 until the opposite side edge (left side edge as viewed in FIG. 2) of the projecting portion 27b of the ratchet 27 engages with the inner circumference of the hole 32. This engaging position is displaced from the initial engaging position, or the position attained at a time when the linings 6 and 7 are not worn, by the distance corresponding to the wear of linings 6 and 7 (more precisely, by the distance equal to the corresponding number of teeth). Thus, the excessively large clearance which, as the linings 6 and 7 wear, appears between these linings 6 and 7 and inner circumferential surface of the drum 8 will be compensated automatically. This portion of the device thus functions as an automatic adjusting device for compensating for wear of the brake shoe linings.

Figure 2:
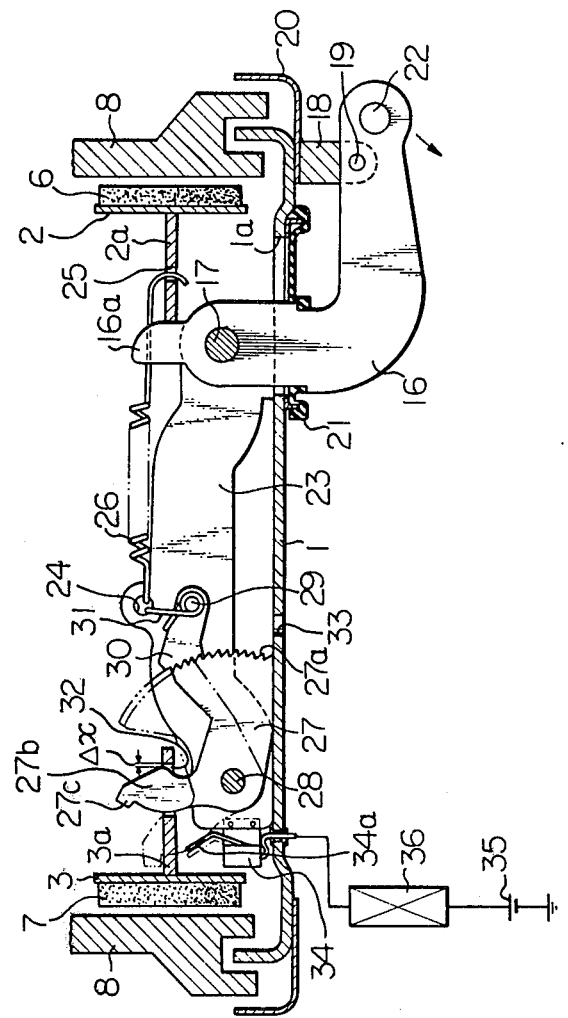
FIG. 2 is a sectional view taken along line A—A of FIG. 1.

In FIG. 2 the initial position of the ratchet 27 is shown by full lines, while the maximum automatically adjustable position for the wear of the linings 6 and 7 is shown by chain lines thus; the wear of linings 6 and 7 is adjustable within the range between the full line position and chain line position.

When the ratchet 27 comes near the maximum automatically adjustable position, the projecting portion 27b of the ratchet 27 comes into contact with the operating member 34a for the limit switch 34 and operates the switch 34. As a result, the warning circuit closes and operates the indicator 36, thus warning the driver that the linings 6 and 7 are excessively worn and need be replaced.

The stop 27c formed on the forward end of the projected portion 27b limits the rotation of ratchet 27 when the brake is operated under such conditions as when the ratchet 27 is being rotated to the position shown by chain lines. Thus, failure of the limit switch 34 can be prevented.

Figure 3:
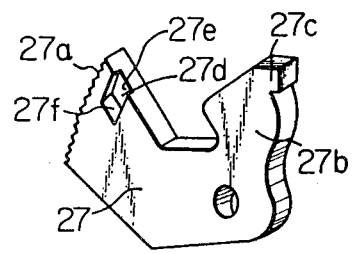
FIG. 3 is a perspective view of the ratchet according to the second embodiment of this invention.

Now the second embodiment of this invention will be described with reference to FIGS. 3 and 4. In contrast with the first embodiment wherein the limit switch 34 is operated by the edge of the projecting portion 27b of the ratchet 27, the limit switch 34 of the second embodiment is operated by a side surface of the ratchet 27. Illustrated in FIG. 3 is perspective view of the ratchet 27 having a groove 27d in one side surface thereof. The groove 27d includes a flat portion 27e and an inclined portion 27f. The ratchet 27 is rotatably mounted on the strut 23 so that the groove 27d is in opposition to one side surface of the strut 23.

Figure 4:
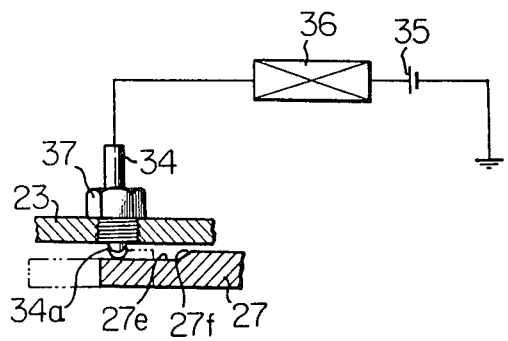
FIG. 4 is a partial sectional elevation of the limit switch portion according to the second embodiment of this invention.

As seen from FIG. 4, the limit switch 34 is mounted on the strut 23 by means of a screw 37, and the operating member 34a of the limit switch 34 projects from the strut 23 so that the forward end thereof projects into the flat portion 27e of the groove 27d when the ratchet 27 is rotated for adjusting the clearance from the initial position to the position immediately before the maximum automatically adjustable position. In the case when the linings 6 and 7 are worn excessively, and the ratchet 27 rotates from the position immediately before the maximum adjustable position to the maximum position, the operating member 34a will be pushed upwardly along the inclined portion 27f (see FIG. 4) so that the limit switch 34 will operate.

While in the foregoing embodiments the rotatable member 27 is made in the form of ratchet, it may also be made, for example, in the form of a cam as described in Japanese Utility Model Publication No. 44-6579. Furthermore, while in the foregoing embodiments the non-rotatable member adapted to support said rotatable member 27 is made in the form of strut 23, the back plate may be used as the non-rotatable member by rotatably mounting said rotatable member 27 directly on the back plate.

The features of the invention will be summarized as follows:

1. The mechanism for automatically adjusting the brake shoe clearance is arranged in association with the switch for the warning circuit. This permits a reliable operation of the warning indicator at any time when necessary irrespective of whether the brake is in operation or not. Especially, when the non-rotatable member is made in the form of a strut as illustrated herein, an improved operational association will be attained between the mechanism for automatically adjusting the brake shoe clearance and the warning circuit.

2. Easy assembly and easy shoe replacement and, besides, the original performance can be maintained even when the shoes are replaced with new ones. These are due to the fact that no components of the warning instruments need be attached directly to the brake shoe.

3. The device of this invention is compact and requires only a minimum mounting space. Also, it can be manufactured at low cost because of its simple construction.

We claim:

1. An adjusting device for use in an internal-shoe drum brake having lined arcuate first and second brake shoes mounted on a stationary back plate, said brake shoes being separable from each other during the braking operation, said device comprising:

a two-part strut extending between said two brake shoes, the length of said two-part strut automatically increasing to compensate for wearing of said shoe linings, said two-part strut comprised of:

a strut member operatively connected to said first brake shoe, and a ratchet member pivotally mounted on said strut member having a projecting end portion thereof engageable with said second brake shoe when the brake lining is worn;

pawl member means biasly mounted on said strut member adjacent said ratchet member and engageable with said ratchet member for engaging said ratchet member and preventing rotation of said ratchet member in the direction which reduces the overall effective length of said two-part strut between said brake shoes as said brake lining on said brake shoes wears away; and said stationary back plate having an opening therethrough behind said ratchet member engaging said pawl member means for contacting therethrough said ratchet member engaging said pawl member means and disengaging the pawl member means from said ratchet member.

* * * * *